United States Patent
Hong et al.

(10) Patent No.: US 9,185,186 B2
(45) Date of Patent: Nov. 10, 2015

(54) METHOD OF IMPLEMENTING CONTENT-CENTRIC NETWORK (CCN) USING INTERNET PROTOCOL (IP)-BASED NETWORK IN GATEWAY, AND GATEWAY

(75) Inventors: Seong Ik Hong, Suwon-si (KR); Byoung Joon Lee, Seongnam-si (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 13/554,161

(22) Filed: Jul. 20, 2012

(65) Prior Publication Data
US 2013/0173822 A1    Jul. 4, 2013

(30) Foreign Application Priority Data
Dec. 28, 2011 (KR) .................. 10-2011-0144860

(51) Int. Cl.
*H04L 29/08* (2006.01)

(52) U.S. Cl.
CPC .................. *H04L 67/327* (2013.01)

(58) Field of Classification Search
CPC ........ G06F 15/16; G06F 21/20; H04L 67/327
USPC .................................. 709/232, 238
See application file for complete search history.

(56) References Cited

U.S. PATENT DOCUMENTS

| | | | |
|---|---|---|---|
| 6,208,620 B1 * | 3/2001 | Sen et al. .................. 370/231 |
| 6,522,629 B1 * | 2/2003 | Anderson, Sr. .............. 370/236 |
| 7,516,198 B1 * | 4/2009 | Appala et al. ............... 709/219 |
| 7,623,505 B1 * | 11/2009 | Holur et al. ................ 370/349 |
| 7,668,969 B1 * | 2/2010 | Kashyap et al. ............. 709/238 |
| 8,667,172 B2 * | 3/2014 | Ravindran et al. ............ 709/238 |
| 2001/0005841 A1 * | 6/2001 | Wray .............................. 705/76 |
| 2004/0012623 A1 * | 1/2004 | Yashiro et al. ................ 345/723 |
| 2004/0122848 A1 * | 6/2004 | Toivonen et al. ............. 707/102 |
| 2004/0141661 A1 * | 7/2004 | Hanna et al. ................. 382/305 |
| 2005/0108573 A1 * | 5/2005 | Bennett et al. ............... 713/201 |
| 2005/0182815 A1 * | 8/2005 | Offredo et al. ............... 709/200 |
| 2006/0230380 A1 * | 10/2006 | Holmes et al. ............... 717/117 |
| 2006/0256788 A1 * | 11/2006 | Donahue ..................... 370/389 |
| 2007/0136777 A1 * | 6/2007 | Hasek et al. .................. 725/114 |
| 2008/0021917 A1 * | 1/2008 | Baker et al. .................. 707/102 |
| 2008/0040496 A1 * | 2/2008 | Zhao et al. ................... 709/230 |
| 2008/0049619 A1 * | 2/2008 | Twiss .......................... 370/236 |
| 2008/0072216 A1 * | 3/2008 | Zhao et al. ................... 717/143 |
| 2008/0310443 A1 * | 12/2008 | Gage .......................... 370/431 |
| 2009/0285123 A1 * | 11/2009 | Huang et al. ................. 370/254 |
| 2009/0285209 A1 * | 11/2009 | Stewart et al. ............... 370/389 |

(Continued)

OTHER PUBLICATIONS

Jacobson et al., "Networking Named Content", 2008.*

(Continued)

*Primary Examiner* — O. C. Vostal
(74) *Attorney, Agent, or Firm* — NSIP Law

(57) ABSTRACT

A method of implementing a Content-Centric Network (CCN) using an Internet Protocol (IP)-based network, and a gateway that may implement such a method, are provided. A method of implementing a CCN using an IP-based network may involve: determining an application protocol and a packet type corresponding to the application protocol of an IP-based network, the application protocol being included in an IP packet of an IP-based network, and generating a content name corresponding to the IP packet, based on the application protocol and the packet type.

28 Claims, 9 Drawing Sheets

(56) References Cited

U.S. PATENT DOCUMENTS

| | | | |
|---|---|---|---|
| 2009/0288163 A1* | 11/2009 | Jacobson et al. | 726/22 |
| 2010/0195653 A1 | 8/2010 | Jacobson et al. | |
| 2010/0195654 A1 | 8/2010 | Jacobson et al. | |
| 2010/0195655 A1* | 8/2010 | Jacobson et al. | 370/392 |
| 2010/0312826 A1* | 12/2010 | Sarosi et al. | 709/203 |
| 2010/0313223 A1* | 12/2010 | Straub | 725/60 |
| 2011/0093618 A1* | 4/2011 | Tso | 709/246 |
| 2011/0231885 A1* | 9/2011 | Liu et al. | 725/115 |
| 2011/0265174 A1* | 10/2011 | Thornton et al. | 726/15 |
| 2012/0076015 A1* | 3/2012 | Pfeffer | 370/252 |
| 2012/0124606 A1* | 5/2012 | Tidwell et al. | 725/17 |
| 2012/0158973 A1* | 6/2012 | Jacobson et al. | 709/227 |
| 2013/0262698 A1* | 10/2013 | Schwan et al. | 709/242 |

OTHER PUBLICATIONS

Xylomenos et al., "Design and Evaluation of a Socket Emulator for Publish/Subscribe Networks", 2010.*
Lagutin et al., "Roles and Security in a Publish/Subscribe Network Architecture", 2010.*
Jacobson et al., "Networking Named Content", 2009.*
Merriam Webster, "processor", 2014.*
Merriam Webster, "generate", 2015.*
Crocker et al., "Augmented BNF for Syntax Specifications: ABNF", RFC 2234 , 1997.*
Si et al., "Content-based and Graph-based Tag Suggestion", 2009.*
Garshol, "BNF and EBNF: What are they and how do they work?", 2008.*

* cited by examiner

METHOD OF IMPLEMENTING CONTENT-CENTRIC NETWORK (CCN) USING INTERNET PROTOCOL (IP)-BASED NETWORK IN GATEWAY, AND GATEWAY

CROSS-REFERENCE TO RELATED APPLICATION(S)

This application claims the benefit under 35 U.S.C. §119(a) of Korean Patent Application No. 10-2011-0144860, filed on Dec. 28, 2011, in the Korean Intellectual Property Office, the entire disclosure of which is incorporated herein by reference for all purposes.

BACKGROUND

1. Field

The following description relates to a gateway and to a method of implementing a Content-Centric Network (CCN) using an Internet Protocol (IP)-based network with a gateway.

2. Description of Related Art

In Content-Centric Networks (CCNs), packets are classified into content-request packets and data-response packets. A content-request packet contains the name of content to be requested, and a data-response packet contains the requested content, the name of the requested content, and the like.

For instance, in a CCN, when networking equipment receives a content-request packet, the networking equipment may search for the requested content from a storage area of the network equipment using the name of the content in the header of the content-request packet. When the requested content is found, the networking equipment may, for example, transfer the content to the content-requesting device. Thus, in CCNs, a content-requesting device may obtain the content from a predetermined node that is located en route to an original owner of the content, provided that the content is stored in a storage area of the predetermined node. Because a request is handled by a node en route to the original owner of the content, overall transmission time may be reduced.

On the other hand, in an Internet Protocol (IP)-based Internet, the content-requesting device obtains the requested content directly from the original owner of the content. Thus, the average length of transmission route for obtaining requested content may be longer in an IP-based network than in a CCN. Accordingly, switching from an IP-based network to a CCN may result in a reduced overall network usage.

Thus, CCNs have been proposed as an alternative networking system to IP-based to networks. However, because the CCN and the IP-based network are conventionally incompatible with each other, an IP-based router is typically replaced by a CCN-based router, to apply the CCN.

SUMMARY

In one general aspect, there is provided a method of implementing a Content-Centric Network (CCN) using an Internet Protocol (IP)-based network, the method involving: determining an application protocol and a packet type corresponding to the application protocol, the application protocol being included in an IP packet of an IP-based network; and generating a content name corresponding to the IP packet, based on the application protocol and the packet type.

The method may further comprise converting the IP packet to a content-request packet for a CCN, using the generated content name.

The generating may comprise generating the content name by looking up a naming-rule server that includes at least one naming rule.

The at least one naming rule may be determined based on the application protocol and the packet type.

The method may further comprise storing, in a local router, at least one part of the at least one naming rule included in the naming-rule server.

The method may further comprise determining whether a two-way transfer scheme or a one-way transfer scheme is used by the application protocol.

The method may further comprise converting an IP packet requesting a content to a content-request packet for a CCN, using the content name, in response to a determination that the two-way transfer scheme is used by the application protocol; and converting an IP packet responding to the IP packet requesting the content to a data-response packet for a CCN, in to response to a determination that the two-way transfer scheme is used by the application protocol.

The method may further comprise transmitting the content-request packet or the data-response packet.

The method may further comprise generating a request packet for a content-request packet, using the generated content name, in response to a determination that the one-way transfer scheme is used by the application protocol; transmitting the generated request packet to a router included in the CCN; receiving the content-request packet from the router; and transmitting the IP packet to the router, in response to the content-request packet.

The content-request packet may be transmitted to the gateway, based on a Pending Interest Table (PIT) generated by the request packet for the content-request packet.

The method may further comprise storing a payload of the IP packet in a content cache of the gateway, based on whether the payload includes data.

The method may further comprise generating a content name corresponding to the stored payload, by looking up the naming-rule server.

The application protocol may include one or more of HTTP, FTP and SMTP.

In another general aspect, there is provided a non-transitory computer readable recording medium storing a program to cause a computer to implement the method described above.

In another general aspect, there is provided a gateway for implementing a Content-Centric Network (CCN) using an Internet Protocol (IP)-based network, the gateway including: a determining unit configured to determine an application protocol and a packet type corresponding to an application protocol, the application protocol being included in an IP packet of an IP-based network; and a generating unit configured to generate a content name corresponding to the IP packet, based on the application protocol and the packet type.

The gateway may further comprise a transfer scheme determining unit configured to determine whether a two-way transfer scheme or a one-way transfer scheme is used by the application protocol.

The gateway may further comprise a first converter configured to convert an IP packet requesting a content using the content name to a content-request packet for a CCN, in response to a determination that a two-way transfer scheme is used by the application protocol; and a second converter configured to convert an IP packet responding to the IP packet requesting the content, to a data-response packet for a CCN, in response to a determination that a two-way transfer scheme is used by the application protocol.

The gateway may further comprise a transmitter configured to transmit the content-request packet or the data-response packet.

The gateway may further comprise a request packet generator configured to generate a request packet for a content-request packet, using the generated content name, in response to a determination that the one-way transfer scheme is used by the application protocol; and a transmission and reception managing unit configured to transmit the generated request packet to a router included in the CCN, and configured to receive the content-request packet from the router, and to transmit the IP packet to the router, in response to the content-request packet.

The content-request packet may be transmitted to the gateway, based on a Pending Interest Table (PIT) generated by the request packet for the content-request packet.

The gateway may further comprise a content cache to store a payload of the IP packet, based on whether the payload includes data.

The application protocol may include one or more of HTTP, FTP and SMTP.

In another general aspect, there is provided a router for converting an IP packet to a CCN-compatible packet, comprising: a packet generator configured to convert an IP packet of an IP-based network to a CCN-compatible packet; and a transmitter configured to transmit the CCN-compatible packet to a second router in a CCN.

The CCN-compatible packet may be a content-request packet or a data-response packet.

The packet generator may convert the IP packet to the CCN-compatible packet by adding a header that includes a content name to the IP packet.

The packet generator may convert the IP packet to the CCN-compatible packet by replacing a header of the IP packet with a header that includes a content name.

The router may further comprise a content name generator configured to generate a content name based on an application protocol and a packet type of the IP packet, the packet generator converting the IP packet to the CCN-compatible packet by including the content name in the CCN-compatible packet.

The router may further comprise a content cache to store a payload of the IP packet, based on whether the payload includes data.

The application protocol may include one or more of HTTP, FTP and SMTP.

Other features and aspects will be apparent from the following detailed description, the drawings, and the claims.

Figure 1:
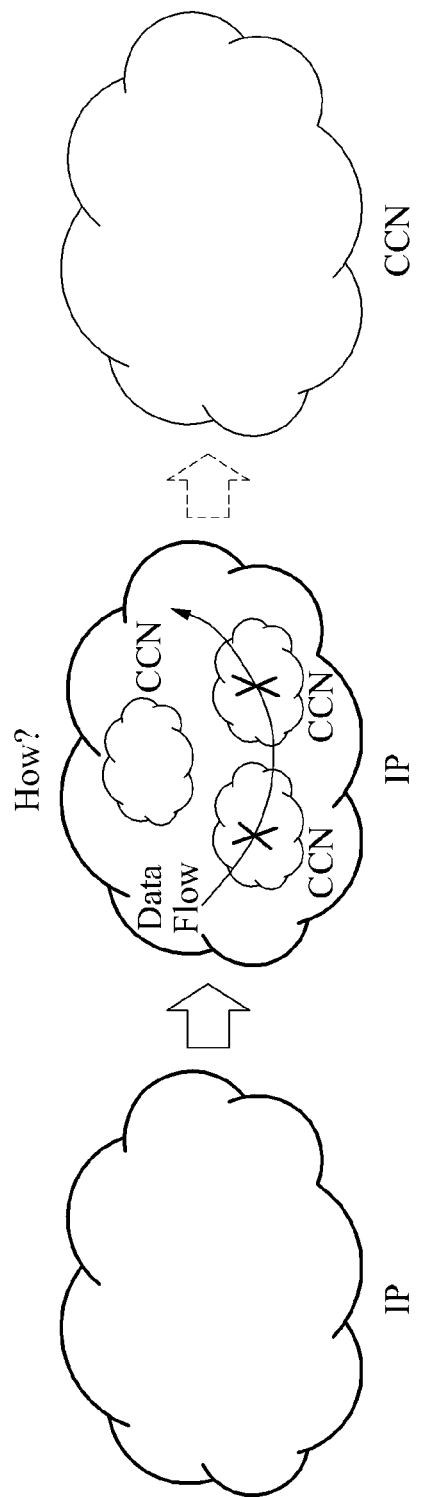
FIG. 1 is a diagram illustrating an example of a method for implementing a Content-Centric Network (CCN) using an Internet Protocol (IP)-based network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Any sequences of processing steps and/or operations described herein are merely examples, and the sequences of processing steps and/or operations are not limited to the specific examples set forth herein, and may be changed as will be apparent to one or ordinary skill in the art, with the exception of processing steps and/or operations necessary to occur in a certain order to carry out the methods. Also, description of well-known functions and constructions may be omitted for increased clarity and conciseness.

FIG. 1 illustrates an example of a method for implementing areas of Content-Centric Network (CCN) using an Internet Protocol (IP)-based network. The network may be used by terminals to communicate.

Referring to FIG. 1, the IP-based network and the CCN may be gradually deployed to apply the CCN in the IP-based network.

To replace every IP-based router installed throughout the world with CCN-based routers is an unreasonable solution due to labor and time. Accordingly, there is a demand for a method of using both IP-based routers and CCN-based routers that are incompatible with each other to implement a CCN using an IP-based network.

In the example of FIG. 1, a CCN is applied to a part of an IP-based network. In this example, the CCN may interoperate with the IP-based network while maintaining the characteristic of the CCN.

Accordingly, a CCN may be implemented using an IP-based network, despite IP-based routers being replaced by CCN-based routers in a unit of a predetermined area.

Figure 2:
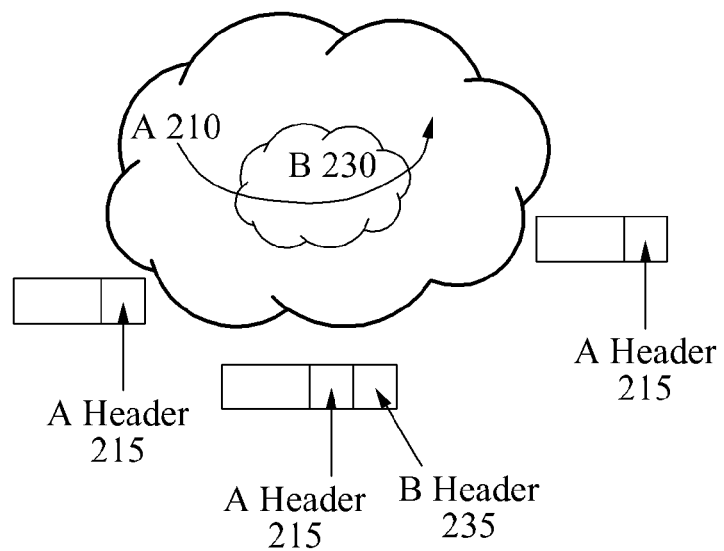
FIG. 2 is a diagram illustrating an example of an encapsulation scheme that is used to interoperate different networks, such as an IP-based network and a CCN.
Figure 3:
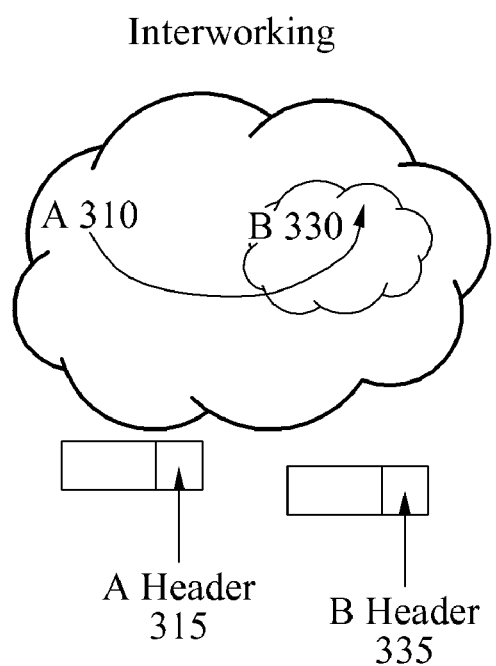
FIG. 3 is a diagram illustrating an example of an interworking scheme that is used to interoperate different networks, such as an IP-based network and a CCN.

FIG. 2 illustrates an example of an encapsulation scheme. FIG. 3 illustrates an example of an interworking scheme. Encapsulation schemes and interworking schemes are proposed as methods of allowing two or more different networks to interoperate together. For example, encapsulation schemes and interworking schemes can be proposed as methods of interoperating an IP-based network and a CCN.

Referring to the encapsulation scheme of FIG. 2, to pass a packet from area 210 that uses protocol A to area 230 that uses protocol B, a header 235 of protocol B may be added to the protocol A packet including header 215. In response to the packet re-entering area 210 after passing through area 230, a router of area 230 through which the packet passes may delete the header 235. Accordingly, the header 215 may remain.

Referring to the interworking scheme of FIG. 3, to pass a packet from area 310 that uses protocol A to area 330 that uses protocol B, a router of the area 330 may replace a header 315 of protocol A with a header 335 of protocol B.

However, various issues may arise using the encapsulation scheme and/or the interworking scheme to interoperate the IP-based network with the CCN.

For example, in the IP-based network, searching, routing, and the like may be performed using an address of a counterpart, for example an IP and the like. Conversely, in the CCN, searching, routing, and the like may be performed using a content name. Accordingly, a first issue is determining how to convert the address to the content name.

As another example, in the IP-based network, a router may perform a packet transfer function only. Conversely, in the CCN, a router may also perform a caching function for storing content, in addition to the packet transfer function. Accordingly, a second issue is determining how to store a payload included in an IP packet in a content cache of the router.

As another example, in the IP-based network, a network protocol may use a 'one-way transfer scheme' to reach a destination. Conversely, the CCN should use a 'two-way transfer scheme' for transmitting a content request packet requesting a desired content, and for receiving data corresponding to the content request packet. Accordingly, a third issue is determining how to convert the one-way transfer scheme to the two-way transfer scheme.

Figure 5:
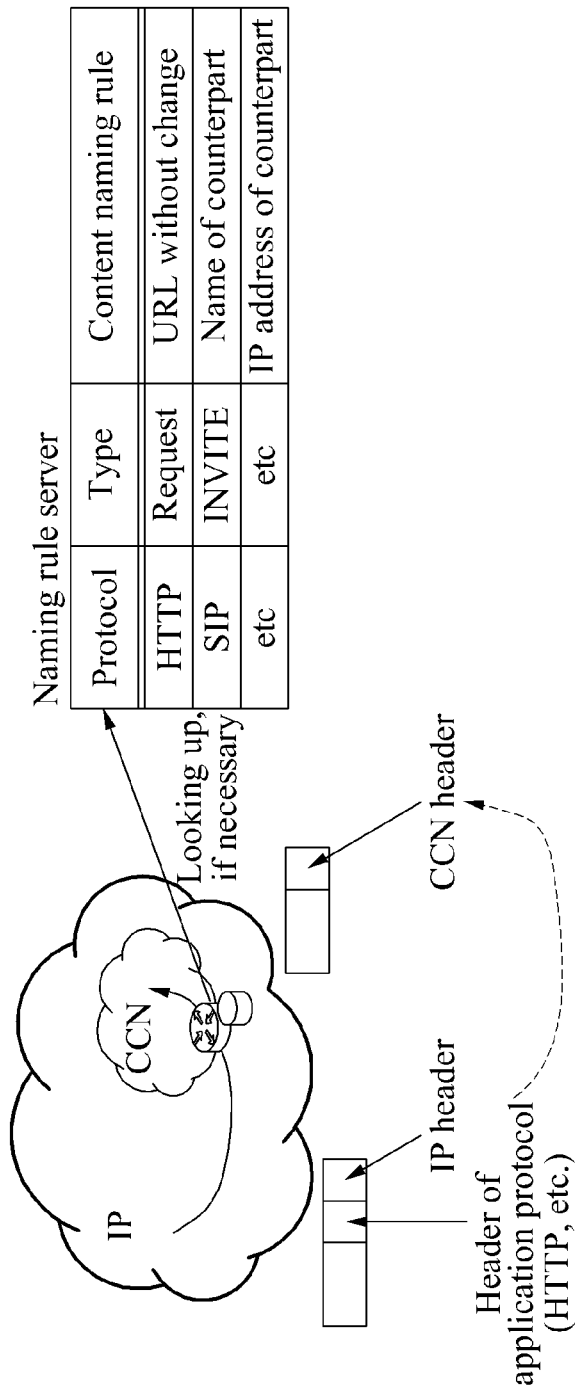
FIG. 5 is a diagram illustrating an example of a naming-rule server generating a content name corresponding to an IP packet.
Figure 6:
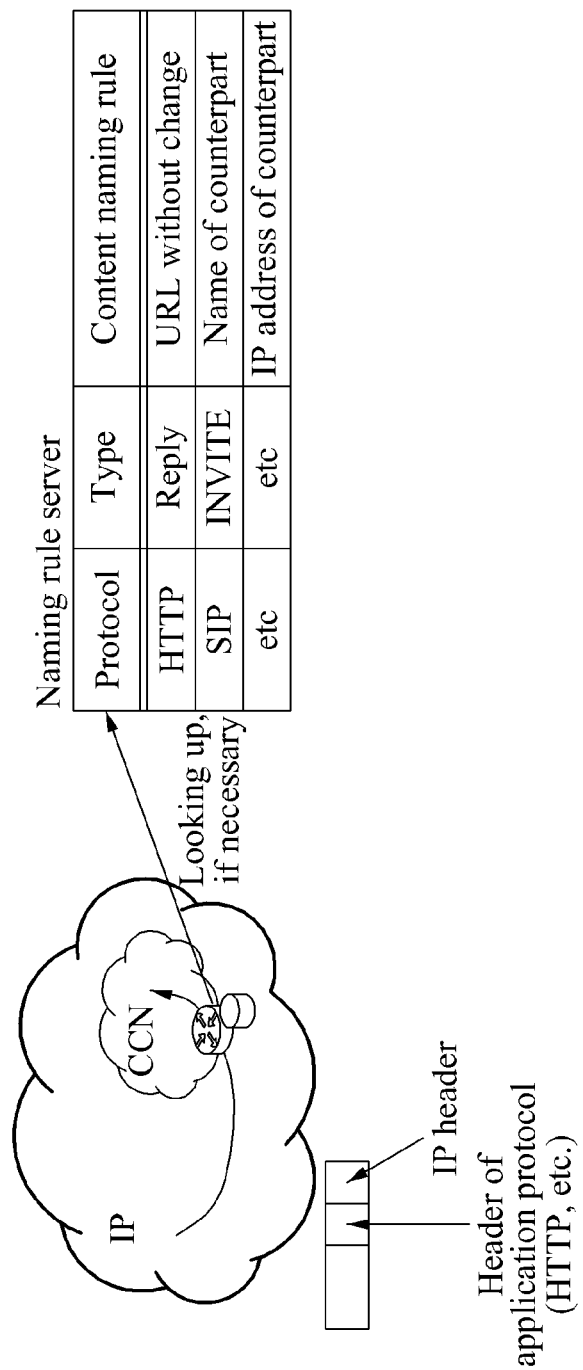
FIG. 6 is a diagram illustrating an example of an operation of storing a payload of an application protocol included in an IP packet in an IP-based network.

FIGS. 5 and 6 describe examples which may be used to address the first and second issues, respectively.

An example for addressing the third issue is to convert the one-way transfer scheme of the IP-based network to the two-way transfer scheme of the CCN, may be to verify an application protocol included in an IP. Additionally, different conversion methods may be used based on a type of transfer scheme used by the application protocol, examples of which to are described with reference to FIGS. 7 and 8.

Figure 4:
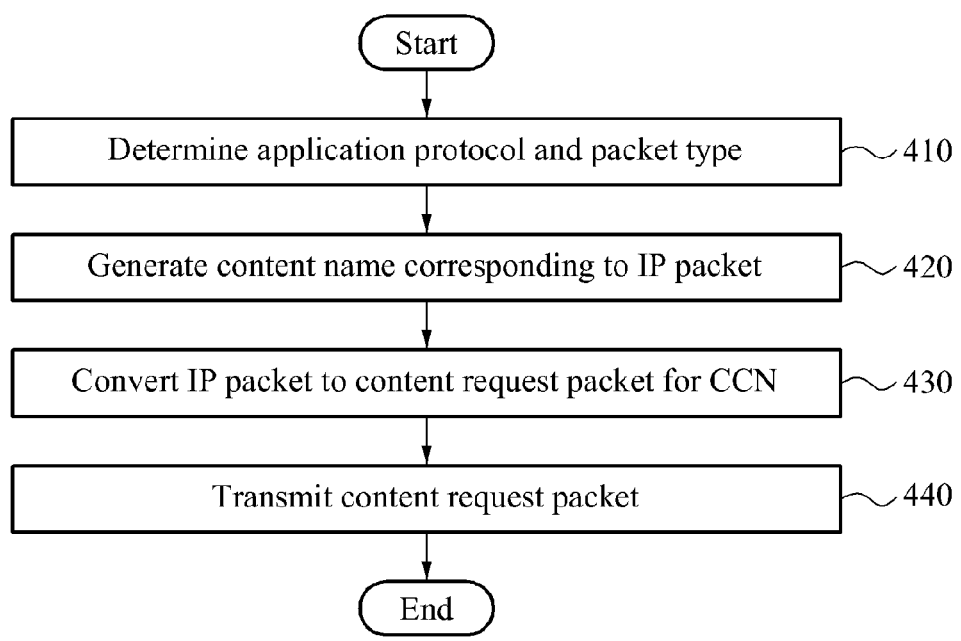
FIG. 4 is a flowchart illustrating an example of a method for implementing a CCN using an IP-based network.

FIG. 4 illustrates an example of a method for implementing a CCN using an IP-based network.

Referring to FIG. 4, in 410, a gateway determines an application protocol and a packet type that corresponds to the application protocol. For example, a gateway may be a router, access point, terminal, computer, server, node or the like, and may serve as a bridge between two or more networks using different protocols. Information regarding the type of application protocol used may be included in an IP packet used in the IP-based network.

In 420, the gateway generates a content name that corresponds to the IP packet, based on the application protocol and the packet type. The gateway may be used for both the IP-based network and the CCN. For example, the gateway may generate a content name corresponding to the IP packet, based on an application protocol included in a payload of the IP packet, and based on a packet type corresponding to the application protocol.

An example of generating content name using a naming-rule server is described with reference to FIG. 5. The naming-rule server may include at least one naming rule used to generate a content name that may be included in a content-request packet. For example, the at least one naming rule may be determined based on the application protocol included in the payload of the IP packet and the packet type corresponding to the application protocol. In this example, the gateway may generate a content name by looking up the naming-rule server.

The gateway may store at least one part of a naming rule in a local router. For example, a frequently used naming rule and the like stored in the naming-rule server may be stored in the local router. As another example, gateway may look up the naming-rule server, to search for a naming rule that is not stored in the local router.

In 430, the gateway converts the IP packet to a content-request packet for the CCN, using the content name generated in 420. In 440, the gateway transmits the content-request packet.

FIG. 5 illustrates an example of a naming-rule server generating a content name corresponding to an IP packet. In this example, the content name is generated using an application protocol included in the IP packet in an IP-based network.

Referring to FIG. 5, the naming-rule server may include at least one naming rule. For example, the at least one naming rule may be used to generate a content name that may be included in a content-request packet. The at least one naming rule may be determined based on an application protocol included in a payload of the IP packet, and a packet type corresponding to the application protocol.

For example, if the application protocol is a Hypertext Transfer Protocol (HTTP), and if the packet type indicates a request packet, a naming rule may be set to use a Uniform Resource Locator (URL) as a content name, without change. The URL may use both a host and a Hypertext Markup Language (HTML) file that is requested by the HTTP.

Accordingly, based on the naming-rule server, the gateway may convert a packet that includes a header of an application protocol, such as the HTTP of FIG. 5, and a header of an IP which is transferred from the IP-based network, to a packet that may be transferred from the CCN.

The naming-rule server may be operated by a network operator. For example, a new application protocol may be released. The network operator may write a naming rule, based on a number of considerations such as the new application protocol, a packet type corresponding to the new application protocol, and the like. The network operator may then store the written naming rule in a naming-rule server.

FIG. 6 illustrates an example of storing a payload of an application protocol included in an IP packet in an IP-based network. For example, the payload may be stored in a cache such as a content cache of a gateway.

Referring to FIG. 6, the gateway may verify a header and a payload of the application protocol included in the IP packet. For example, if the payload includes data, namely content, the gateway may store the payload of the application protocol in the content cache of the gateway. In this example, the gateway may generate a content name corresponding to the stored payload, by looking up a naming-rule server including at least one naming rule.

Figure 7:
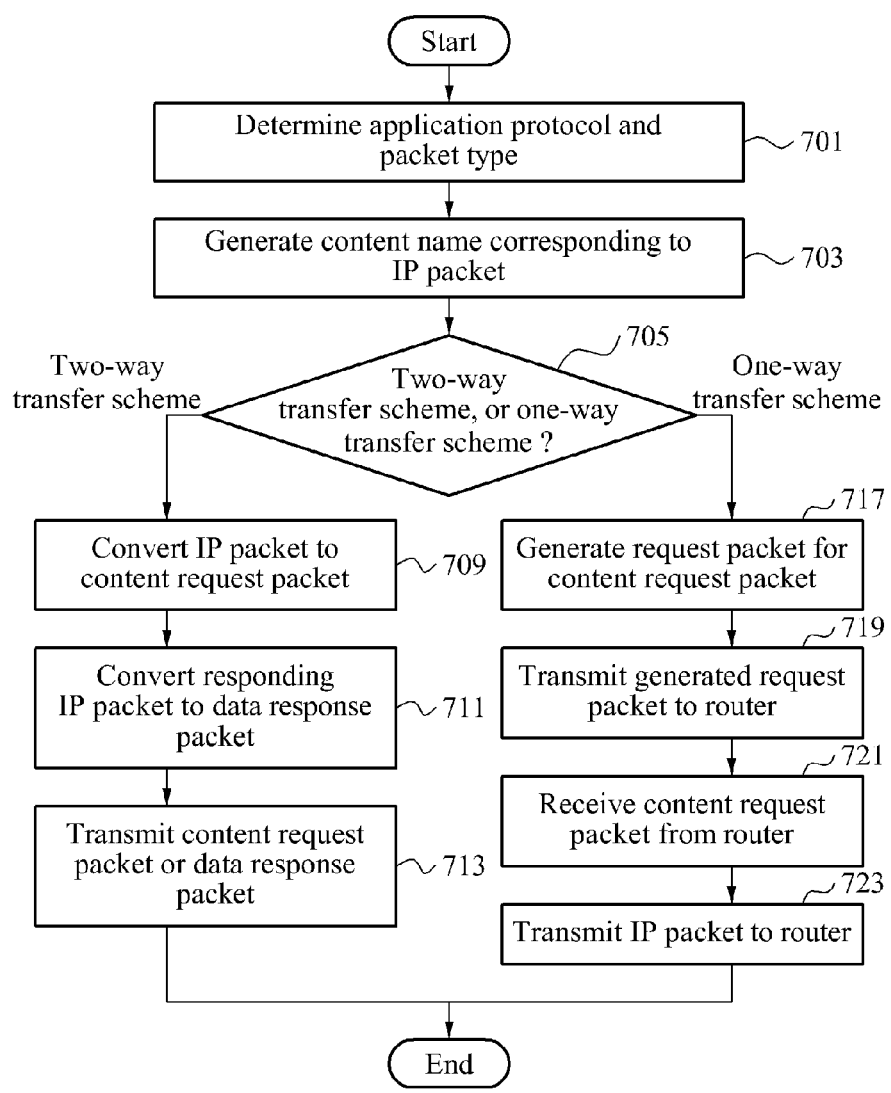
FIG. 7 is a flowchart illustrating another example of a method for implementing a CCN using an IP-based network.

FIG. 7 illustrates another example of a method for implementing a CCN using an IP-based network.

Referring to FIG. 7, in 701, when the gateway receives an IP packet, the gateway determines an application protocol and a packet type corresponding to the application protocol of the packet. Information regarding the type of the application protocol used by the packet may be included in the IP packet received from the IP-based network.

In 703, the gateway generates a content name corresponding to the IP packet, based on the application protocol and the packet type determined in 701. The gateway may be used for both an IP-based network and a CCN-based Internet.

For instance, in 703, the gateway may generate a content name corresponding to the IP packet, based on an application protocol included in a payload of the IP packet and based on a packet type corresponding to the application protocol.

To generate the content name, the gateway may use the above-described naming-rule server of FIG. 5.

In 705, the gateway determines whether a two-way transfer scheme or a one-way transfer scheme is used by the application protocol.

An IP-based application protocol may typically be classified into a protocol using a two-way transfer scheme and a protocol using a one-way transfer scheme. The two-way transfer scheme may enable the transfer of two messages, namely a request message and a response message. The one-way transfer scheme may enable simply the transfer of one message.

Accordingly, to change the one-way transfer scheme of the IP-based network to the two-way transfer scheme of the CCN, the gateway may use the following methods.

First, the gateway may verify: (1) the type of application protocol included in an IP packet, and (2) the type of transfer scheme used by the application protocol. Available types of application protocols include an HTTP, a File Transfer Protocol (FTP), a Simple Mail Transfer Protocol (SMTP), and the like.

When an HTTP is used as the application protocol, there are at least two available packet types: (1) a request packet and (2) a response packet. For instance, when a user sends a request packet for 'hotmusiclist.html' from the domain "YouTube.com," a YouTube server may transmit to the user a response packet carrying the corresponding file.

In this example, an actual operation of the IP packet may be identical to that of a CCN. Accordingly, an IP packet used to transfer an HTTP request packet may be converted to a CCN content-request (namely, an interest), and an IP packet used to transfer an HTTP response packet may be converted to a CCN-based data-response packet.

In the event that it is determined in 705 that a two-way transfer scheme is used by the application protocol, the gateway converts an IP packet requesting content using the content name, to a content-request packet for the CCN in 709.

In 711, the gateway converts an IP packet responding to the IP packet that requests the content to a CCN-based data-response packet.

In 713, the gateway transmits the content-request packet or the data-response packet to another gateway or to a router included in the CCN.

In the event that it is determined in 705 that a one-way transfer scheme is used by the application protocol, the gateway may perform operations 717 through 723 as illustrated in FIG. 7.

Figure 8:
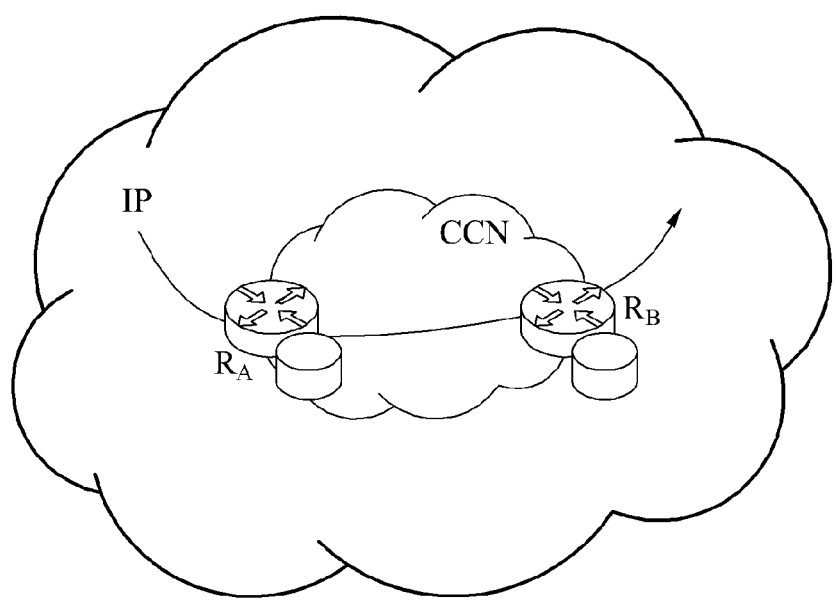
FIG. 8 is a diagram illustrating an example of an operation of a gateway.

An IP packet that includes an application protocol for transferring a message without a request packet may be changed from a one-way transfer scheme to a two-way transfer scheme used in CCNs to implement the process illustrated in FIG. 8.

Hereinafter, a process of converting a one-way transfer scheme to a two-way transfer scheme by using a gateway and a router included in a CCN-based network area will be described.

In 717, the gateway generates a request packet for a CCN-based content-request packet using the content name generated in 703.

In 719, the gateway transmits the generated request packet to a router included in the CCN. In 721, the gateway receives the content-request packet from the router.

In 721, the router may transmit the content-request packet to the gateway, based on a Pending Interest Table (PIT). The PIT may be generated by the request packet for the content-request packet.

In 723, the gateway transmits an IP packet to the router, in response to the content-request packet.

Operations 717 through 723 will be further described with reference to FIG. 8.

FIG. 8 illustrates an example of an operation of a gateway performed when a one-way transfer scheme is used by an application protocol included in an IP packet used in an IP-based network.

As described above, an IP packet that includes an application protocol that is used to merely transfer a message without a request packet may be changed from a one-way transfer scheme to a two-way transfer scheme used in CCNs.

As illustrated in FIG. 8, routers $R_A$ and $R_B$ in a CCN may function as gateways.

For example, when an IP packet is received from an IP-based network, the router $R_A$ may generate a request packet Interest_A for a content-request packet, using a content name. The request packet Interest_A may correspond to the received IP packet.

The router $R_A$ may transmit the request packet Interest_A to the router $R_B$ within the CCN. The router $R_B$ may be the last router in the CCN through which the IP packet passes.

When the request packet Interest_A is received, the router $R_B$ may generate a content-request packet Interest_B for the CCN, and may transmit the content-request packet Interest_B to the router $R_A$. The content-request packet Interest_B may be transmitted to the gateway, along a trace of a PIT, together with a data-response packet responding to the content-request packet Interest_B. The PIT may be generated by the request packet Interest_A.

When the content-request packet Interest_B is received, the router $R_A$ may transmit the received IP packet to the router $R_B$. Accordingly, the IP packet may be transferred again to the IP-based network through the router $R_B$.

Figure 9:
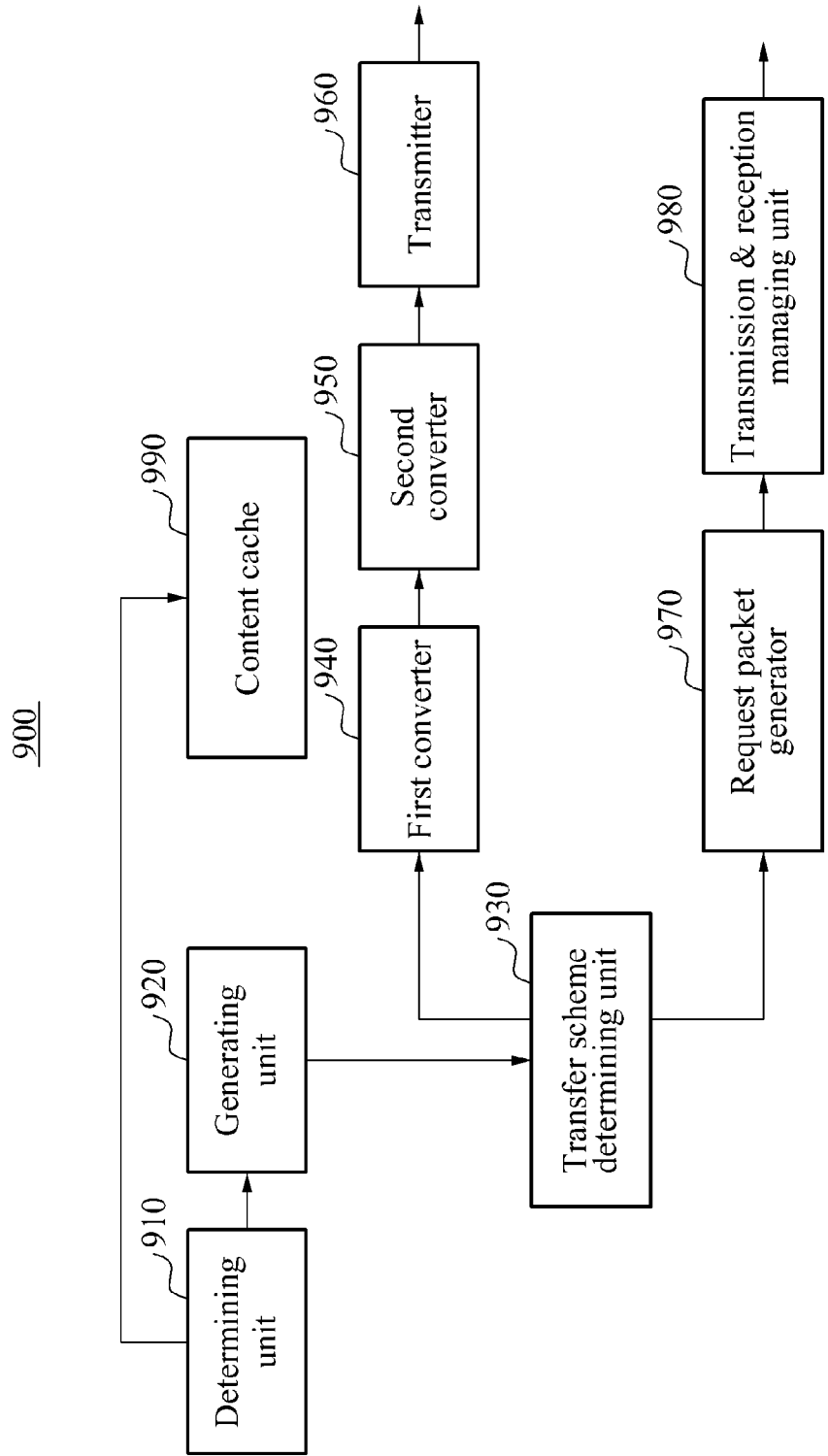
FIG. 9 is a diagram illustrating an example of a gateway for implementing a CCN using an IP-based network.

FIG. 9 illustrates an example of a gateway for implementing a CCN using an IP-based network.

Referring to FIG. 9, a gateway 900 includes a determining unit 910, and a generating unit 920. The gateway 900 may further include a transfer scheme determining unit 930, a first converter 940, a second converter 950, a transmitter 960, a request packet generator 970, a transmission and reception managing unit 980, and a content cache 990.

The determining unit 910 may determine an application protocol, and a packet type corresponding to the application protocol. Information regarding the type of application protocol used may be included in an IP packet received from the IP-based network.

The generating unit 920 may generate a content name corresponding to the IP packet, based on the type of application protocol and the packet type.

The transfer scheme determining unit 930 may determine whether a two-way transfer scheme or a one-way transfer scheme is used by the application protocol.

In an example in which the transfer scheme determining unit 930 determines that the two-way transfer scheme is used by the application protocol, the first converter 940 may convert an IP packet requesting content using the content name to a content-request packet for a CCN.

In this example, the second converter 950 may convert an IP packet responding to the IP packet requesting the content, to a data-response packet for a CCN.

The transmitter 960 may transmit the content-request packet, or the data-response packet.

In another example in which the transfer scheme determining unit 930 determines that the one-way transfer scheme is used by the application protocol, the request packet generator 970 may generate a request packet for a CCN-based content-request packet using the content name.

The transmission and reception managing unit 980 may transmit the request packet generated by the request packet generator 970 to a router included in the CCN, and may receive the content-request packet from the router. In response to the content-request packet, the transmission and reception managing unit 980 may transmit the IP packet to the router.

The content cache 990 may store a payload of the IP packet, based on whether the payload includes data.

According to the above examples, it is possible to implement a CCN within an IP-based network, by generating a content name corresponding to an IP packet, based on the type of the application protocol included in the IP packet and the packet type corresponding to the application protocol.

Additionally, according to the above examples, it is possible to convert a transfer scheme of an application protocol included in an IP packet to a transfer scheme suitable for a to CCN packet, by determining whether the transfer scheme is a one-way transfer scheme or a two-way transfer scheme.

Further, provided herein are general aspects of a method that may gradually apply a Content-Centric Network (CCN) technology to an Internet Protocol (IP)-based Internet. The CCN technology may perform routing using a content name, may temporally store content in a storage area of network equipment, and may enable a node including corresponding content in a storage area of the node to respond to a request for the corresponding content. Also, aspects of the CCN technology described herein may be applied in various networking apparatuses such as base stations, Long Term Evolution (LTE) femtocells, and Access Points (APs).

The method according to the above-described examples may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to to perform the operations and methods described above, or vice versa.

Further, the processes or steps of determining, generating, caching, converting, transmitting, and determining may be performed on one or more processors, and the above-described determining unit, generating unit, cache, transfer scheme determining unit, converters, transmitters, generator, and transmission and reception managing unit may include a processor, a non-transitory memory, and other hardware components.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of implementing a Content-Centric Network (CCN) using an Internet Protocol (IP)-based network, the method comprising:
   determining an application protocol and a packet type corresponding to the application protocol, the application protocol being included in an IP packet of the IP-based network;
   determining a naming rule based on the application protocol and the packet type corresponding to the application protocol; and
   generating a content name based on the naming rule.

2. The method of claim 1, further comprising:
   converting the IP packet to a content-request packet for the CCN, using the generated content name.

3. The method of claim 1, wherein the determining the naming rule comprises looking up a naming-rule server that includes at least one naming rule.

4. The method of claim 1, wherein if the application protocol is a Hyper-text Transfer Protocol, and if the packet type indicates a request packet, the naming rule can be set to use a Uniform Resource Locator as a content name.

5. The method of claim 3, further comprising:
   storing, in a local router, at least one part of the at least one naming rule included in the naming-rule server.

6. The method of claim 1, further comprising:
   determining whether a two-way transfer scheme or a one-way transfer scheme is used by the application protocol.

7. The method of claim 6, wherein:
   the IP packet is an IP packet requesting a content;
   the method further comprises converting the IP packet requesting the content to a content-request packet for the CCN, using the content name, in response to determining that the two-way transfer scheme is used by the application protocol; and
   the method further comprises converting an IP packet responding to the IP packet requesting the content to a data-response packet for the CCN, in response to determining that the two-way transfer scheme is used by the application protocol.

8. The method of claim 7, further comprising:
   transmitting the content-request packet or the data-response packet.

9. The method of claim 6, further comprising:
   generating a request packet for a content-request packet, using the generated content name, in response to a determination that the one-way transfer scheme is used by the application protocol;
   transmitting the generated request packet to a router included in the CCN;
   receiving the content-request packet from the router; and
   transmitting the IP packet to the router, in response to the content-request packet.

10. The method of claim 9, wherein the content-request packet is transmitted to the gateway, based on a Pending Interest Table (PIT) generated by the request packet for the content-request packet.

11. The method of claim 1, further comprising:
storing a payload of the IP packet in a content cache of the gateway, based on whether the payload includes data.

12. The method of claim 11, further comprising:
generating a content name corresponding to the stored payload, by looking up the naming-rule server.

13. The method of claim 1, wherein the application protocol includes one or more of HTTP, FTP and SMTP.

14. A gateway for implementing a Content-Centric Network (CCN) using an Internet Protocol (IP)-based network, the gateway comprising:
at least one processor device;
a determining unit of the at least one processor device configured to determine an application protocol and a packet type corresponding to the application protocol, the application protocol being included in an IP packet of the IP-based network, and to determine a naming rule based on the application protocol and the packet type corresponding to the application protocol; and
a generating unit of the at least one processor device configured to generate a content name based on the naming rule.

15. The gateway of claim 14, further comprising:
a transfer scheme determining unit configured to determine whether a two-way transfer scheme or a one-way transfer scheme is used by the application protocol.

16. The gateway of claim 15, wherein:
the IP packet is an IP packet requesting a content;
the gateway comprises a first converter configured to convert the IP packet requesting the content to a content-request packet for the CCN, using the content name, in response to a determination that the two-way transfer scheme is used by the application protocol; and
the gateway comprises a second converter configured to convert an IP packet responding to the IP packet requesting the content to a data-response packet for the CCN, in response to a determination that the two-way transfer scheme is used by the application protocol.

17. The gateway of claim 16, further comprising:
a transmitter configured to transmit the content-request packet or the data-response packet.

18. The gateway of claim 15, further comprising:
a request packet generator configured to generate a request packet for a content-request packet, using the generated content name, in response to a determination that the one-way transfer scheme is used by the application protocol; and
a transmission and reception managing unit configured to transmit the generated request packet to a router included in the CCN, and configured to receive the content-request packet from the router, and to transmit the IP packet to the router, in response to the content-request packet.

19. The gateway of claim 18, wherein the content-request packet is transmitted to the gateway, based on a Pending Interest Table (PIT) generated by the request packet for the content-request packet.

20. The gateway of claim 14, further comprising:
a content cache to store a payload of the IP packet, based on whether the payload includes data.

21. The gateway of claim 14, wherein the application protocol includes one or more of HTTP, FTP and SMTP.

22. A router for converting an IP packet to a CCN-compatible packet, the router comprising:
a packet generator configured to convert an IP packet received from an IP-based network to a CCN-compatible packet by generating a content name based on a naming rule; and
a transmitter configured to transmit the CCN-compatible packet to a second router in a CCN,
wherein the naming rule is determined based on an application protocol included in a payload of the IP packet and a packet type corresponding to the application protocol.

23. The router of claim 22, wherein the CCN-compatible packet is a content-request packet or a data-response packet.

24. The router of claim 22, wherein the packet generator converts the IP packet to the CCN-compatible packet by adding a header that includes a content name to the IP packet.

25. The router of claim 22, wherein the packet generator converts the IP packet to the CCN-compatible packet by replacing a header of the IP packet with a header that includes a content name.

26. The router of claim 22, further comprising:
a content name generator configured to generate the content name based on the application protocol and the packet type of the IP packet.

27. The router of claim 22, further comprising:
a content cache to store a payload of the IP packet, based on whether the payload includes data.

28. The router of claim 26, wherein the application protocol includes one or more of HTTP, FTP and SMTP.

* * * * *